US012683406B2

(12) United States Patent
Yang

(10) Patent No.: US 12,683,406 B2
(45) Date of Patent: Jul. 14, 2026

(54) MULTI-THROW OR MULTI-POLE SWITCHING SYSTEMS AND METHODS FOR PROVIDING MODULAR SWITCHING COMBINATIONS FOR ENABLING FLEXIBLE HOME ENERGY MANAGEMENT

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 25 days.

(21) Appl. No.: 18/351,866

(22) Filed: Jul. 13, 2023

(65) Prior Publication Data

US 2025/0023361 A1 Jan. 16, 2025

(51) Int. Cl.
| | |
|---|---|
| *H02J 3/007* | (2026.01) |
| *H02J 3/38* | (2006.01) |
| *H02J 3/46* | (2026.01) |
| *H02J 7/35* | (2006.01) |
| *H02J 9/06* | (2006.01) |

(52) U.S. Cl.
CPC .............. *H02J 3/46* (2013.01); *H02J 3/007* (2020.01); *H02J 3/381* (2013.01); *H02J 7/35* (2013.01); *H02J 9/068* (2020.01)

(58) Field of Classification Search
CPC .... H02J 3/007; H02J 3/38; H02J 3/381; H02J 3/388; H02J 3/46; H02J 3/466; H02J 7/34; H02J 7/35; H02J 9/06; H02J 9/061; H02J 9/062; H02J 9/068; H02J 2300/20; H02J 2300/22; H02J 2300/24

See application file for complete search history.

(56) References Cited

U.S. PATENT DOCUMENTS

| | | | |
|---|---|---|---|
| 2016/0172900 A1* | 6/2016 | Welch, Jr. ............ | H05K 7/1492 |
| | | | 307/64 |
| 2017/0346292 A1 | 11/2017 | Handelsman et al. | |
| 2018/0048159 A1* | 2/2018 | Narla ...................... | H02S 40/30 |
| 2019/0081458 A1* | 3/2019 | Lapushner ............... | H02J 9/06 |
| 2020/0169113 A1 | 5/2020 | Beaucage et al. | |
| 2021/0135489 A1 | 5/2021 | Stites-Clayton et al. | |
| 2023/0163601 A1 | 5/2023 | Allo | |

* cited by examiner

*Primary Examiner* — Levi Gannon

(57) ABSTRACT

Multi-throw or multi-pole switching systems and methods are provided for providing modular switching combinations for enabling flexible home energy management. A switching system comprises an energy management system configured to switch between a plurality of energy sources (e.g., a utility, backup energy source(s) and energy storage component(s)) automatically/manually to enable flexible configurations thereof. The switching system further comprises one or more modular transfer switches configured to add to the energy management system one or more energy sources. If a module is made of n poles then adding each module can add n-1 energy resources. The one or more modular transfer switches are multi-throw or multi-pole switches.

4 Claims, 4 Drawing Sheets

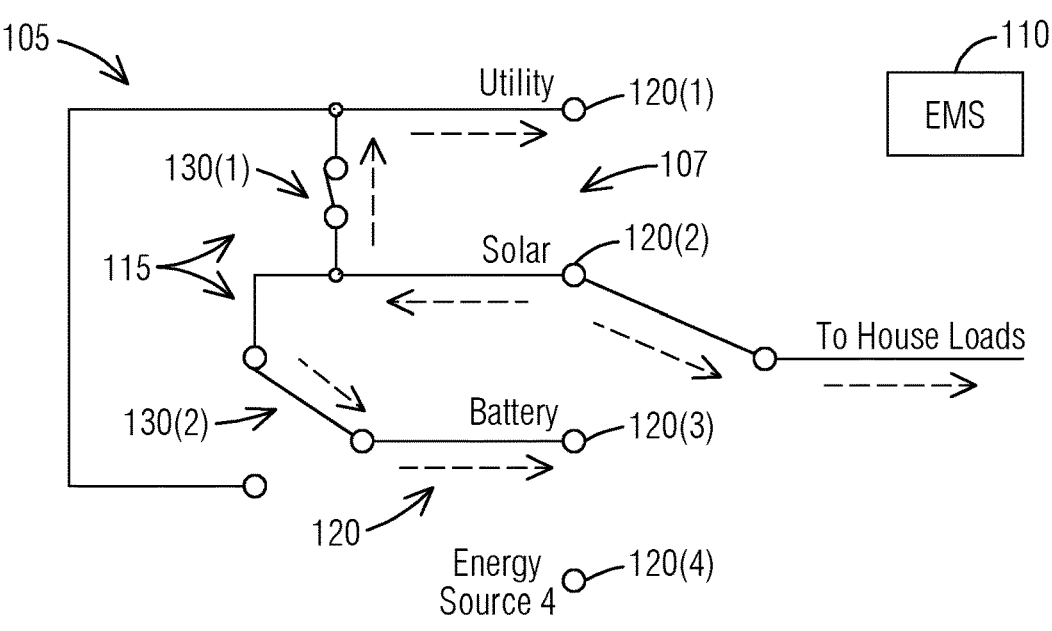

FIG. 1

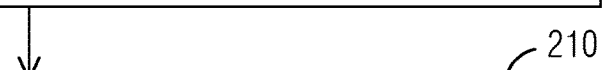

Provide an energy management system configured to switch between a plurality of energy sources automatically/manually to enable flexible configurations thereof for a switching system, wherein the plurality of energy sources includes a utility, one or more renewable power sources and one or more energy storage components Provide one or more modular transfer switches as one or more modules configured to add to the energy management system one or more energy sources from the plurality of energy sources, wherein if a module is made of n poles than adding each module can add n-1 energy resources including the utility, the one or more renewable power sources and the one or more energy storage components, wherein the one or more modular transfer switches are multi-throw or multi-pole switches

FIG. 2

MULTI-THROW OR MULTI-POLE SWITCHING SYSTEMS AND METHODS FOR PROVIDING MODULAR SWITCHING COMBINATIONS FOR ENABLING FLEXIBLE HOME ENERGY MANAGEMENT

BACKGROUND

1. Field

Aspects of the present invention generally relate to multi-throw or multi-pole switching systems and methods for providing modular switching combinations for enabling flexible home energy management.

2. Description of the Related Art

Individual houses have seen increasing demand of electricity, especially with the growing popularity of electric vehicles. This increasing demand has shown possible shortage of electricity if relying on utilities alone. Furthermore, under uncontrollable circumstances, such as extreme weather conditions, utility powers can be easily disrupted. To ensure that basic essential functions of a home, such as air conditioners, cook tops, refrigerators and so on, are still available under such conditions, backup powers have also become increasingly popular. Moreover, many utility companies now accept locally generated energy to be sold back to the grid, to save homeowners' cost. As a result, more houses are equipped with additional energy sources than just utility power. Common energy sources as of today are backup generators, solar systems, battery systems, and electric vehicles, with wind power and hydropower being less popular. These different power sources can be installed into a single home with many different combinations, together with the already available utilities. However, only one source can be used at a certain time to power the house.

Therefore, an energy management system is then needed to switch between these power sources automatically/manually, and to allow flexible configurations based on customer's needs.

SUMMARY

Briefly described, aspects of the present invention relate to multi-throw or multi-pole switching systems and methods for providing modular switching combinations for enabling flexible home energy management. This invention proposes a switching diagram that is based on modular transfer switches, which allows flexible configurations. No known diagram is there to the best of knowledge.

In accordance with one illustrative embodiment of the present invention, a switching system is provided. It comprises an energy management system configured to switch between a plurality of energy sources automatically/manually to enable flexible configurations thereof. The plurality of energy sources includes a utility, one or more backup energy sources and one or more energy storage components. The switching system further comprises one or more modular transfer switches as one or more modules configured to add to the energy management system one or more energy sources from the plurality of energy sources. If a module is made of n poles then adding each module can add n-1 energy resources including the utility, the one or more backup energy sources and the one or more energy storage components. The one or more modular transfer switches are multi-throw or multi-pole switches.

In accordance with one illustrative embodiment of the present invention, a method of providing a switching system is provided. It comprises providing an energy management system configured to switch between a plurality of energy sources automatically/manually to enable flexible configurations thereof. The plurality of energy sources includes a utility, one or more backup energy sources and one or more energy storage components. The method further comprises providing one or more modular transfer switches as one or more modules configured to add to the energy management system one or more energy sources from the plurality of energy sources. If a module is made of n poles then adding each module can add n-1 energy resources including the utility, the one or more backup energy sources and the one or more energy storage components. The one or more modular transfer switches are multi-throw or multi-pole switches.

In accordance with one illustrative embodiment of the present invention, a quadruple switching system for providing modular switching combinations for enabling flexible home energy management is provided. It comprises an energy management system configured to switch between a plurality of energy sources automatically/manually to enable flexible configurations thereof. The plurality of energy sources includes a utility, a solar power source, a battery, and another backup energy source, and wherein the solar power source is powering a home. The quadruple switching system further comprises one or more modular transfer switches as one or more modules including a quadruple-throw switch module configured to add to the energy management system one or more energy sources from the plurality of energy sources. The quadruple-throw switch module is made of multiple poles so adding the quadruple-throw switch module can add multiple energy resources including the utility, the solar power source, the battery and another backup energy source. The one or more modular transfer switches include a net-metering switch to allow energy to be sold back to the utility, and a charging switch to select the battery.

In accordance with one illustrative embodiment of the present invention, a double-throw switching system for providing modular switching combinations for enabling flexible home energy management is provided. It comprises an energy management system configured to switch between a plurality of energy sources automatically/manually to enable flexible configurations thereof. The plurality of energy sources includes a utility, a solar power source, a battery, and another backup energy source. The double-throw switching system further comprises one or more modular transfer switches as one or more modules including a double-throw switching module configured to add to the energy management system one or more energy sources from the plurality of energy sources. Each switching module is a double-throw switch such that by using multiple double-throw switching modules, the double-throw switching system realizes substantially the same functionalities as in a quadruple switching system. The double-throw switching module is made of multiple poles so adding the double-throw switching module can add multiple energy resources including the utility, the solar power source, the battery and another backup energy source. The one or more modular transfer switches include a net-metering switch to allow energy to be sold back to the utility, and a charging switch to select the battery.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 1 illustrates a switching system with a quadruple-throw switch while solar powering house, comprising an energy management system and one or more modular transfer switches as one or more modules in accordance with an embodiment of the present invention.

FIG. 2 illustrates a method of providing a switching system to switch between a plurality of energy sources automatically/manually to enable flexible configurations thereof in accordance with an embodiment of the present invention.

DETAILED DESCRIPTION

Figure 3:
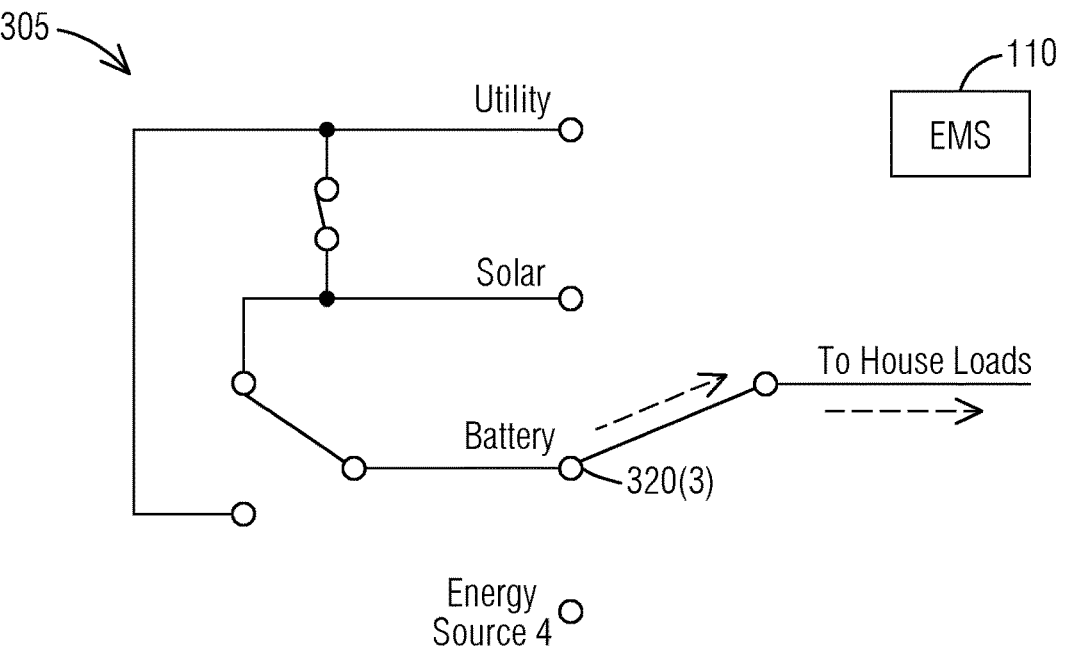
FIG. 3 illustrates a quadruple switching system with battery powering house for providing modular switching combinations for enabling flexible home energy management in accordance with an embodiment of the present invention.

Various technologies that pertain to systems and methods that provide a system and a method for providing modular switching combinations to enable flexible home energy management are presented. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a system and a method for providing modular switching combinations to enable flexible home energy management. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the system and the method are provided for providing modular switching combinations to enable flexible home energy management according to the present disclosure are described below with reference to FIGS. 1-9 herein. Like reference numerals used in the drawings identify similar or identical elements throughout the several views. The drawings are not necessarily drawn to scale.

Consistent with one embodiment of the present invention. FIG. 1 represents a switching system 105 with a quadruple-throw switch 107 while solar powering house, comprising an energy management system (EMS) 110 and one or more modular transfer switches 115 as one or more modules in accordance with an embodiment of the present invention. The energy management system (EMS) 110 is a system of computer-aided tools used by operators of electric utility grids to monitor, control, and optimize the performance of the generation or transmission system. Also, it can be used in small scale systems like microgrids. The computer technology is also referred to as SCADA/EMS or EMS/SCADA. SCADA is the acronym for Supervisory Control and Data Acquisition. SCADA is a computer-based system for gathering and analyzing real-time data to monitor and control equipment that deals with critical and time-sensitive materials or events. In these respects, the terminology EMS then excludes the monitoring and control functions, but more specifically refers to the collective suite of power network applications and to the generation control and scheduling applications.

The energy management system 110 is configured to switch between a plurality of energy sources 120 automatically/manually to enable flexible configurations thereof. The plurality of energy sources 120 includes a utility 120(1), one or more backup energy sources 120(2) (e.g., solar), one or more energy storage components 120(3) (e.g., battery) and an energy source 120(4). Backup energies are locally generated energies, which may include renewable energies and fuel burning energy sources (like a backup generator). Backup energies may be sold back to utilities if permitted.

Energy storage is energy stored by either utilities or backup energies and can supply energy only for certain period of time if not refilled.

The modular transfer switches 115 as one or more modules are configured to add to the energy management system 110 one or more energy sources from the plurality of energy sources 120. If a module is made of n poles then adding each module can add n-1 energy resources including the utility 120(1), the one or more backup energy sources 120(2) and the one or more energy storage components 120(3). The one or more modular transfer switches 115 are multi-throw or multi-pole switches. The one or more modular transfer switches 115 include a net-metering switch 130(1) to allow energy to be sold back to the utility 120(1), and a charging switch 130(2) to select the battery of the one or more energy storage components 120(3).

In one embodiment, the switching system 105 is a quadruple switching system and the one or more modular transfer switches 115 are a quadruple-throw switch module. The number of poles on a switch defines how many separate circuits the switch can control. So a switch with one pole, can only influence one single circuit. A four-pole switch can separately control four different circuits.

In another embodiment, the switching system 105 is a double-throw switching system and the one or more modular transfer switches 115 are a double-throw switch module. A Double Pole Double Throw (DPDT) switch consists of six terminals, two of which are independent input terminals. Each of the poles can complete two different circuits. In other words, each input terminal connects with two output terminals, and all four output terminals are separate.

The one or more modular transfer switches 115 are interlocked with one connection possible at a time. Transfer switch detects a power failure and automatically commands the generator to turn on. There are two types of automatic transfer switches, circuit breaker and contactor. The circuit breaker type has two interlocked circuit breakers, so only one breaker can be closed any anytime. The contactor type is simpler design that is electrically operated and mechanically held.

The energy management system 110 can allow automatic switching among the different modes where either solar powering a home, or battery powering the home, or utility powering the home, or another backup energy source powering the home. The energy management system 110 can automatically coordinate between different modules of the one or more modules.

Referring to FIG. 2, it illustrates a method 200 of providing the switching system 105 to switch between the plurality of energy sources 120 automatically/manually to enable flexible configurations thereof in accordance with an embodiment of the present invention. Reference is made to the elements and features described in FIGS. 1, 3-9. It should be appreciated that some steps are not required to be performed in any particular order, and that some steps are optional.

The method 200 comprises a step 205 of providing the energy management system 110 configured to switch between the plurality of energy sources 120 automatically/manually to enable flexible configurations thereof. The plurality of energy sources 120 includes a utility, one or more backup energy sources and one or more energy storage components. The method 200 further comprises a step 210 of providing the modular transfer switches 115 as one or more modules configured to add to the energy management system 110 one or more energy sources from the plurality of energy sources 120. If a module is made of n poles then adding each module can add n-1 energy resources including the utility, the one or more backup energy sources and the one or more energy storage components. The one or more modular transfer switches 115 are multi-throw or multi-pole switches.

Figure 4:
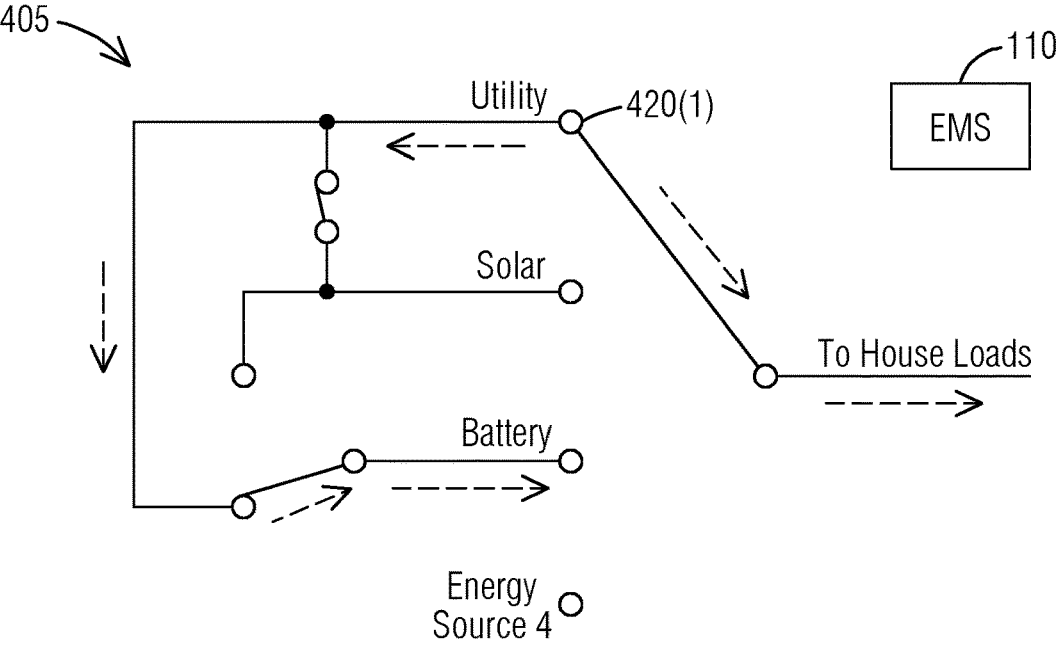
FIG. 4 illustrates a quadruple switching system with utility powering house for providing modular switching combinations for enabling flexible home energy management in accordance with an embodiment of the present invention.
Figure 5:
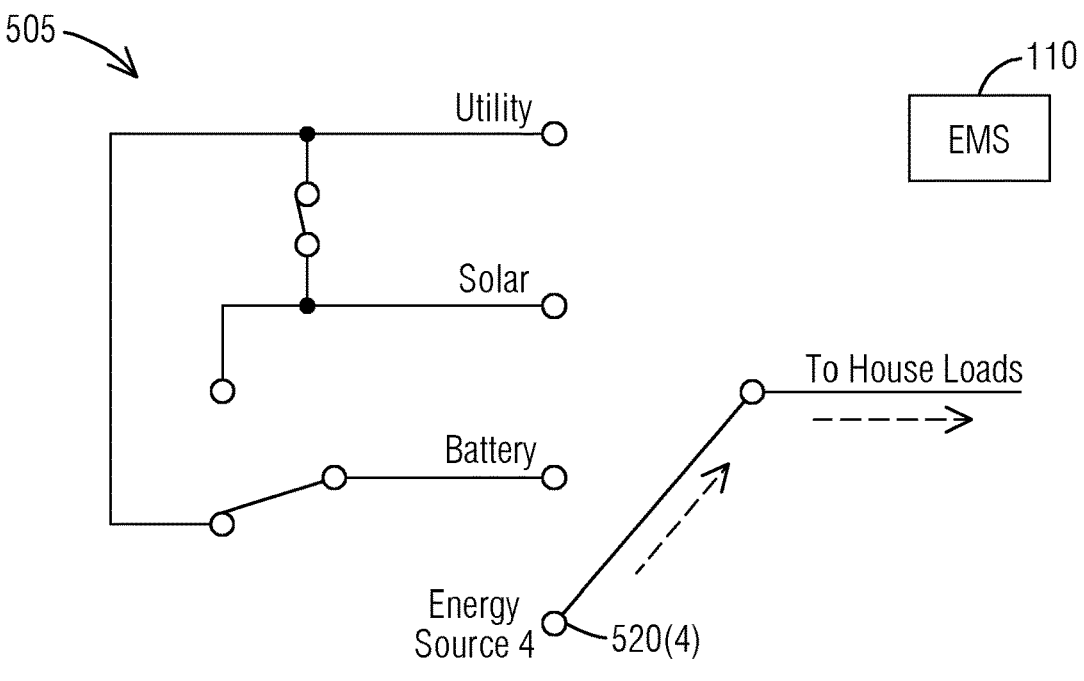
FIG. 5 illustrates a quadruple switching system with another backup energy source powering house for providing modular switching combinations for enabling flexible home energy management in accordance with an embodiment of the present invention.

Turning to FIG. 3, it illustrates a quadruple switching system 305 with a battery 320(3) powering a house for providing modular switching combinations for enabling flexible home energy management in accordance with an embodiment of the present invention. FIG. 4 illustrates a quadruple switching system 405 with a utility 420(1) powering a house for providing modular switching combinations for enabling flexible home energy management in accordance with an embodiment of the present invention. As seen in FIG. 5, it illustrates a quadruple switching system 505 with another backup energy source 520(4) powering house for providing modular switching combinations for enabling flexible home energy management in accordance with an embodiment of the present invention.

A quadruple switching system is configured to provide modular switching combinations for enabling flexible home energy management. The quadruple switching system comprises an energy management system configured to switch between a plurality of energy sources automatically/manually to enable flexible configurations thereof. The plurality of energy sources includes a utility, a solar power source, a battery, and another backup energy source. The solar power source is powering a home. The quadruple switching system further comprises one or more modular transfer switches as one or more modules including a quadruple-throw switch module configured to add to the energy management system one or more energy sources from the plurality of energy sources. The quadruple-throw switch module is made of multiple poles so adding the quadruple-throw switch module can add multiple energy resources including the utility, the solar power source, the battery and the another backup energy source. The one or more modular transfer switches include a net-metering switch 130(1) to allow energy to be sold back to the utility, and a charging switch 130(2) to select the battery.

In one quadruple switching system, instead of the solar power source powering the home the battery may be powering the home. In another quadruple switching system, instead of the solar power source powering the home the utility may be powering the home. In yet another quadruple switching system, instead of the solar power source powering the home another backup energy source may be powering the home.

To assure only one power source to power the house, the switching systems, such as transfer switches, are normally interlocked with one connection possible at a time. They essentially become multi-throw or multi-pole switches. FIG. 1 gives an example of a quadruple-throw switch with four energy sources. In FIG. 1, it is the solar panels powering the house loads, as in a typical application. At the same time, it can also charge the battery for backup purposes through the charging switch 130(2). And if there is still excessive energy and the utility company allows, it can send the energy back to the grid through the net-metering switch 130(1). When solar energy is not enough, such as nighttime, the quadruple-throw switch can switch to battery power, as shown in FIG. 3. If both solar and battery are not enough, it can be switched to utility to draw power from the grid, and at the same time, the charging switch 130(2) can switch to charge battery from the grid, as shown in FIG. 4. In the situation where all three powers have failed, it still can switch to a different power source, energy source 4 (e.g., a backup generator), for backup power, as in FIG. 5. An energy management system can allow automatic switching among the different modes from FIG. 1. FIG. 3-FIG. 5.

The system in FIG. 1 provides plenty of options for the end users. However, not all users may install as many energy sources as shown. Also, a quadruple-throw switch is technically challenging and costly to produce. For the users that need less energy sources. FIG. 1 solution becomes less cost effective and likely occupies more space that it needs to.

Figure 6:
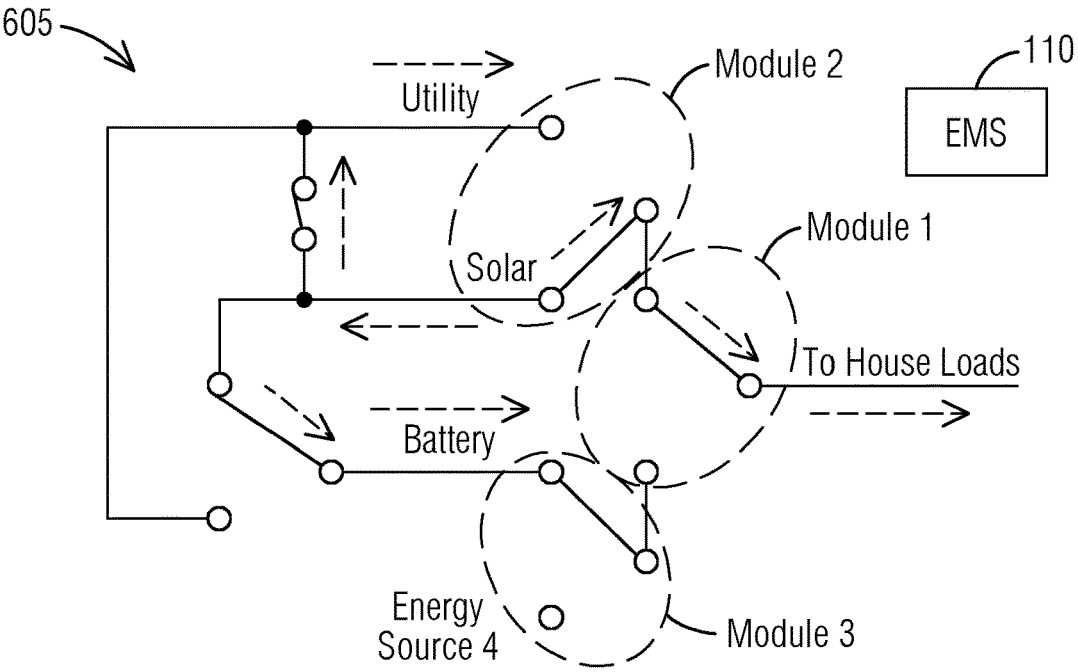
FIG. 6 illustrates a double-throw switching system with double-throw switch modules for four energy sources for providing modular switching combinations to enable flexible home energy management in accordance with an embodiment of the present invention.
Figure 7:
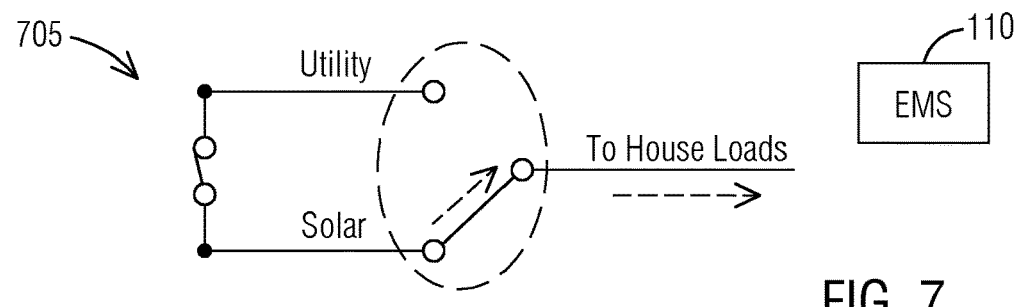
FIG. 7 illustrates a double-throw switching system with double-throw switch modules for two energy sources for providing modular switching combinations to enable flexible home energy management in accordance with an embodiment of the present invention.

As shown in FIG. 6, it illustrates a double-throw switching system 605 with double-throw switch modules for four energy sources for providing modular switching combinations to enable flexible home energy management in accordance with an embodiment of the present invention. In FIG. 7, it illustrates a double-throw switching system 705 with double-throw switch modules for two energy sources for providing modular switching combinations to enable flexible home energy management in accordance with an embodiment of the present invention. With regard to FIG. 8, it illustrates a double-throw switching system 805 with double-throw switch modules for three energy sources for providing modular switching combinations to enable flexible home energy management in accordance with an embodiment of the present invention. With respect to FIG. 9, it illustrates a double-throw switching system 905 with double-throw switch modules for five energy sources for providing modular switching combinations to enable flexible home energy management in accordance with an embodiment of the present invention.

A double-throw switching system is configured to provide modular switching combinations for enabling flexible home energy management. The double-throw switching system comprises an energy management system configured to switch between a plurality of energy sources automatically/manually to enable flexible configurations thereof. The plurality of energy sources includes a utility, a solar power source, a battery, and another backup energy source. The double-throw switching system further comprises one or more modular transfer switches as one or more modules including a double-throw switching module configured to add to the energy management system one or more energy sources from the plurality of energy sources. Each switching module is a double-throw switch such that by using multiple double-throw switching modules, the double-throw switching system realizes substantially the same functionalities as in a quadruple switching system. The double-throw switching module is made of multiple poles so adding the double-throw switching module can add multiple energy resources including the utility, the solar power source, the battery and the another backup energy source. The one or more modular transfer switches include a net-metering switch to allow energy to be sold back to the utility, and a charging switch to select the battery.

In one double-throw switching system, instead of using 3 double-throw switching modules in the double-throw switching system a single double-throw switching module is used for two energy sources. In another double-throw switching system, instead of 3 double-throw switching modules in the double-throw switching system two double-throw switching modules are used for three energy sources. In yet another double-throw switching system, instead of 3 double-throw switching modules in the double-throw switching system four double-throw switching modules are used for five energy sources.

FIGS. 6-9 show a solution to the problem in FIG. 1. Each switching module is a double-throw switch. By using three modules, FIG. 6 realizes the same functionalities as in FIG.

Figure 8:
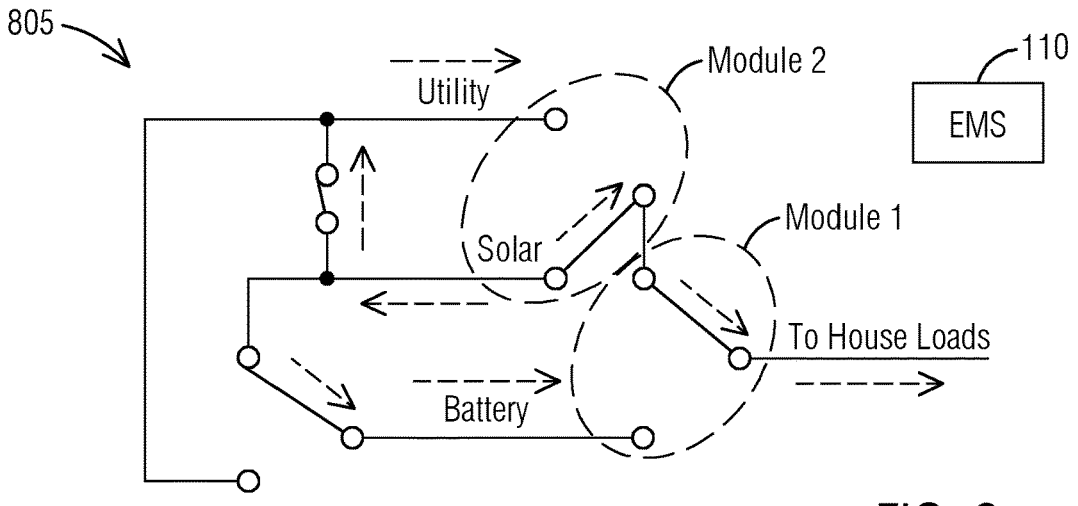
FIG. 8 illustrates a double-throw switching system with double-throw switch modules for three energy sources for providing modular switching combinations to enable flexible home energy management in accordance with an embodiment of the present invention.
Figure 9:
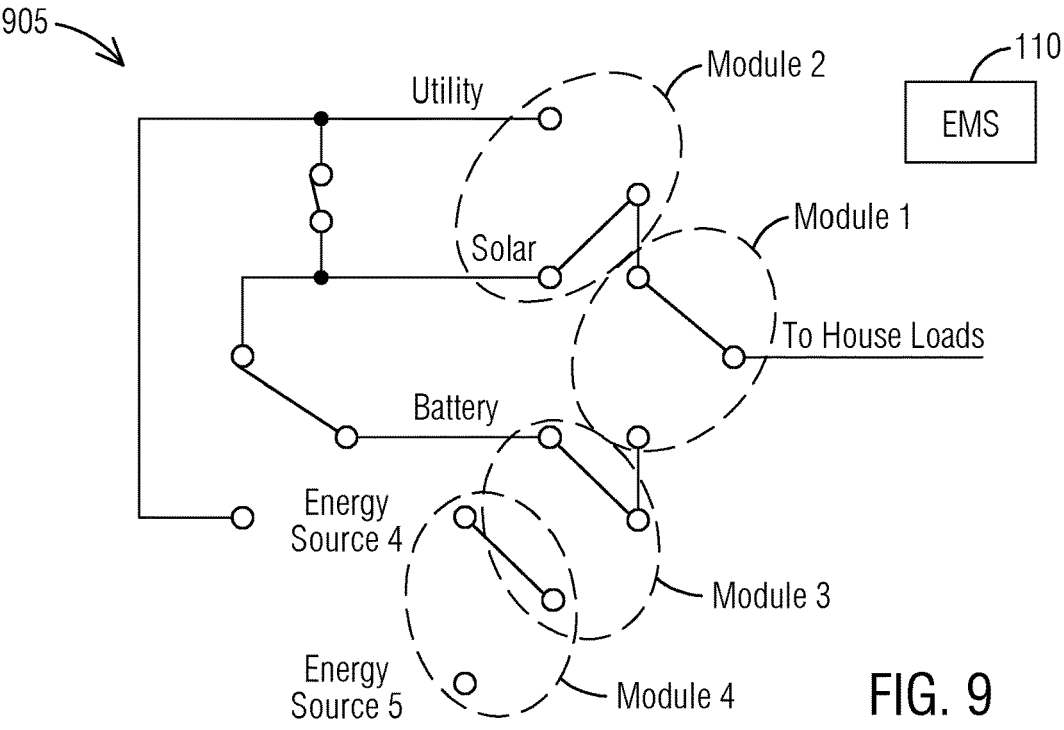
FIG. 9 illustrates a double-throw switching system with double-throw switch modules for five energy sources for providing modular switching combinations to enable flexible home energy management in accordance with an embodiment of the present invention.

1. The advantages of the modular system in FIGS. 6-9 is that it can easily accommodate more or less energy sources by adding or removing modules. For example, if users prefer using solar to power the house and selling excessive energy back to the grid, only one module is needed as shown in FIG. 7. In this case, instead of solar, the user can also choose to have a battery or a backup generator for backup purposes only, if the utility company does not allow energy back to grid. If users select to have both solar and battery, two modules are needed as shown in FIG. 8. If users select to have more than four sources, modules can also be added to FIG. 6, as shown in FIG. 9. An energy management system can automatically coordinate different modules.

The advantage of FIGS. 6-9 is that the less complex and more cost-effective double-throw switches allow easy and user-based configurations. If more technically challenging switches are used as modules, such as triple-throw switches, the general concept still works. In general, if the module is made for n poles, adding each module can add n-1 energy sources.

While a quadruple switching system and a double-throw switching system are described here a range of one or more other multi-throw or multi-pole switching systems are also contemplated by the present invention. For example, other multi-throw or multi-pole switching systems may be implemented based on one or more features presented above without deviating from the spirit of the present invention.

The techniques described herein can be particularly useful for an energy management system for a home/house. While particular embodiments are described in terms of a home/house, the techniques described herein are not limited to such a home/house but can also be used with other types of residential/commercial facilities.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A double-throw switching system in that double-throw switches add energy resources, the double-throw switching system comprising:

an energy management system configured to switch between a plurality of energy sources to enable flexible configurations thereof, wherein the plurality of energy sources includes a utility, a solar power energy source and an energy storage component including a battery; and a plurality of double-throw switches as modular transfer switches configured to add to a load one or more energy sources that are configured to be coordinated by the energy management system, wherein each modular transfer switch is a double-throw switch such that by using multiple double-throw switching modules, the double-throw switching system realizes substantially the same functionalities as in a quadruple switching system, wherein each double-throw switch is made of n throws, and wherein adding each double-throw switch adds n-1 energy resources including the utility, the solar power energy source and the energy storage component including the battery, wherein the switching system includes a net-metering switch to allow energy from the solar power energy source to be sold back to the utility, and a charging switch to select the battery, and wherein the double-throw switches are interlocked with one connection possible at a time so that only one energy resource is connected to an output of each double-throw switch at the time.

2. The double-throw switching system of claim 1, wherein the energy management system is configured to automatically coordinate between different switches of the plurality of double-throw switches.

3. A method of providing a double-throw switching system in that switches add energy resources, the method comprising:

providing an energy management system configured to switch between a plurality of energy sources to enable flexible configurations thereof, wherein the plurality of energy sources includes a utility, a solar power energy source, and an energy storage component including a battery; and providing a plurality of double-throw switches as modular transfer switches configured to add to a load one or more energy sources that are configured to be coordinated by the energy management system, wherein each modular transfer switch is a double-throw switch such that by using multiple double-throw switching modules, the double-throw switching system realizes substantially the same functionalities as in a quadruple switching system, wherein each double-throw switch is made of n throws, and wherein adding each double-throw switch adds n-1 energy resources including the utility, the solar power energy source and the energy storage component including the battery, wherein the switching system includes a net-metering switch to allow energy from the solar power energy source to be sold back to the utility, and a charging switch to select the battery, and wherein the double-throw switches are interlocked with one connection possible at a time so that only one energy resource is connected to an output of each double-throw switch at the time.

4. The method of claim 3, wherein the energy management system is configured to automatically coordinate between different switches of the plurality of double-throw switches.

* * * * *